United States Patent
Kok et al.

(10) Patent No.: US 10,855,592 B2
(45) Date of Patent: Dec. 1, 2020

(54) FLOW BASED SESSION DRAIN DIRECTOR

(71) Applicant: Cumulus Networks Inc., Mountain View, CA (US)

(72) Inventors: Wilson Kok, San Jose, CA (US); Shrijeet Mukherjee, San Carlos, CA (US); James Rivers, Saratoga, CA (US); Andrew R. Harding, Scotts Valley, CA (US)

(73) Assignee: Cumulus Networks Inc., Mountain View, CA (US)

( * ) Notice: Subject to any disclaimer, the term of this patent is extended or adjusted under 35 U.S.C. 154(b) by 90 days.

(21) Appl. No.: 15/824,828

(22) Filed: Nov. 28, 2017

(65) Prior Publication Data

US 2019/0166051 A1     May 30, 2019

(51) Int. Cl.
*H04L 12/803* (2013.01)
*H04L 12/825* (2013.01)
*H04L 12/801* (2013.01)

(52) U.S. Cl.
CPC .......... *H04L 47/125* (2013.01); *H04L 47/122* (2013.01); *H04L 47/193* (2013.01); *H04L 47/266* (2013.01)

(58) Field of Classification Search
CPC ... H04L 47/125; H04L 47/193; H04L 47/266; H04L 47/122
See application file for complete search history.

(56) References Cited

U.S. PATENT DOCUMENTS

| | | | |
|---|---|---|---|
| 2006/0104271 A1* | 5/2006 | Samudra | H04L 49/40 370/389 |
| 2017/0207994 A1* | 7/2017 | Lin | H04L 45/02 |

OTHER PUBLICATIONS

Qazi, Zafar Ayyub; et al., "SIMPLE-fying Middlebox Policy Enforcement Using SDN," SIGCOMM'13, Aug. 12-16, 2013, Hong Kong, China, 12 pages.

* cited by examiner

*Primary Examiner* — Peter P Chau
(74) *Attorney, Agent, or Firm* — Ascenda Law Group, PC

(57) ABSTRACT

To accommodate graceful offloading of connections from a port of a network element, thereby allowing the port to be decommissioned, both existing and new connections allocated to that port according to a load balancing protocol are replicated on a backup port. Thereafter, or concurrently therewith, the port is configured to drop acknowledgements of the new connections, and the port is monitored so as to eventually identify an absence of connections thereon. At that time, the port may be decommissioned inasmuch as all new connections will have been established on the backup port and no previously existing connections on the original port will remain.

15 Claims, 3 Drawing Sheets

FLOW BASED SESSION DRAIN DIRECTOR

FIELD OF THE INVENTION

The present invention is directed to systems and methods by which network infrastructure equipment may participate in flow steering decisions that affect load for paths within a network, and, in particular, to a flow-based session drain director.

BACKGROUND

Load balancing is a common technique used to distribute workload across multiple computer-based platforms. By distributing connections across many different servers, service providers can help to ensure rapid response times for users of an Internet service or website. Server-side load balancing of this kind may be provided by a software routine listening on a port where external clients seek to connect, for example, the hypertext transport protocol (HTTP) port of the public-facing Internet protocol (IP) address of the web site or service, terminating such connections, and then recasting the individual connections to different back-end servers at private IP addresses. In addition to relieving the users from having to know the addresses of individual servers, this kind of load balancing also offers various security and administrative benefits for a network administrator.

The kind of load balancing discussed above can be provided at different levels of granularity. For example, load balancers may front servers and those load balancers may themselves be fronted by one or more levels of load balancers (e.g., in the form of switches or other network infrastructure apparatus) that distribute workload across different load balancer farms or even different, geographically dispersed data centers. Regardless of the load that load balancers or other such infrastructure apparatus may manage, however, there will come times when resources (such as servers, etc.) fronted by a load balancer need to be taken out of service for maintenance or other reasons. Simply disconnecting the resource(s) from the network at any particular instant is generally not desirable as it would lead to disruption of on-going sessions. One can imagine the reaction of a user of an e-commerce site if his or her connection was suddenly disrupted in the middle of a transaction, especially if the user has just provided payment details and was expecting a receipt or other form of confirmation of the transaction which never arrived. Removal of network resources must therefore be provided in a manner that minimizes disruptions of this kind.

SUMMARY

Various embodiments of the present invention find application in computer network arrangements in which a first network element has a plurality of downstream network elements communicatively connected via respective ports with other network elements. For example, a second network element may be communicatively connected to the first network element via a first port, and a third network element may be communicatively connected to the first network element via a second port. Connections are allocated to respective ones of the ports at the first network element according to a load balancing protocol, and, in accordance with the present invention, connections between the first network element and the second network element on the first port are replicated on the second port such that both existing connections on the first port and new connections allocated to the first port according to the load balancing protocol are so replicated on the second port. Thereafter, or concurrently therewith, the first port is configured to prevent initiation of the new connections with the second network element on the first port. The first port is monitored to identify an absence of connections thereon, and the communicative coupling between the first and second network elements on the first port may be decommissioned when the absence of connections thereon has been identified.

In some embodiments of the invention, the first port is configured to prevent initiations of the new connections by installing access control restrictions on the first port. Further, connections between the first network element and the second network element on the first port may be replicated on the second port by defining a replication group that includes the first port and second port. Also, load balancing processes may be employed at the first network element, e.g., across the second port and other ports of the first network element, to accommodate load on the second port created by the replication of connections on the first port on the second port.

The present invention thus provides for graceful fail over, e.g., in maintenance or other situations, without the need for individual flow tracking, which is often costly in terms of complexity and traffic throughput degradation. For example, there is no need for installation of additional fronting elements (e.g., such as load balancers) when decommissioning a port on a network infrastructure component (e.g., a switch, load balancer, etc.). To ensure optimal traffic distribution during port maintenance procedures, multiple backup paths may be used simultaneously (if available), each forming a separate multicast group with the in-maintenance path. Multiple redirection rules may be employed, with a path index serving as an additional match criterion. These and further advantages and embodiments of the invention are discussed in greater detail below.

BRIEF DESCRIPTION OF THE DRAWINGS

The present invention is illustrated by way of example, and not limitation, in the figures of the accompanying drawings, in which.

DETAILED DESCRIPTION

Figure 1A:
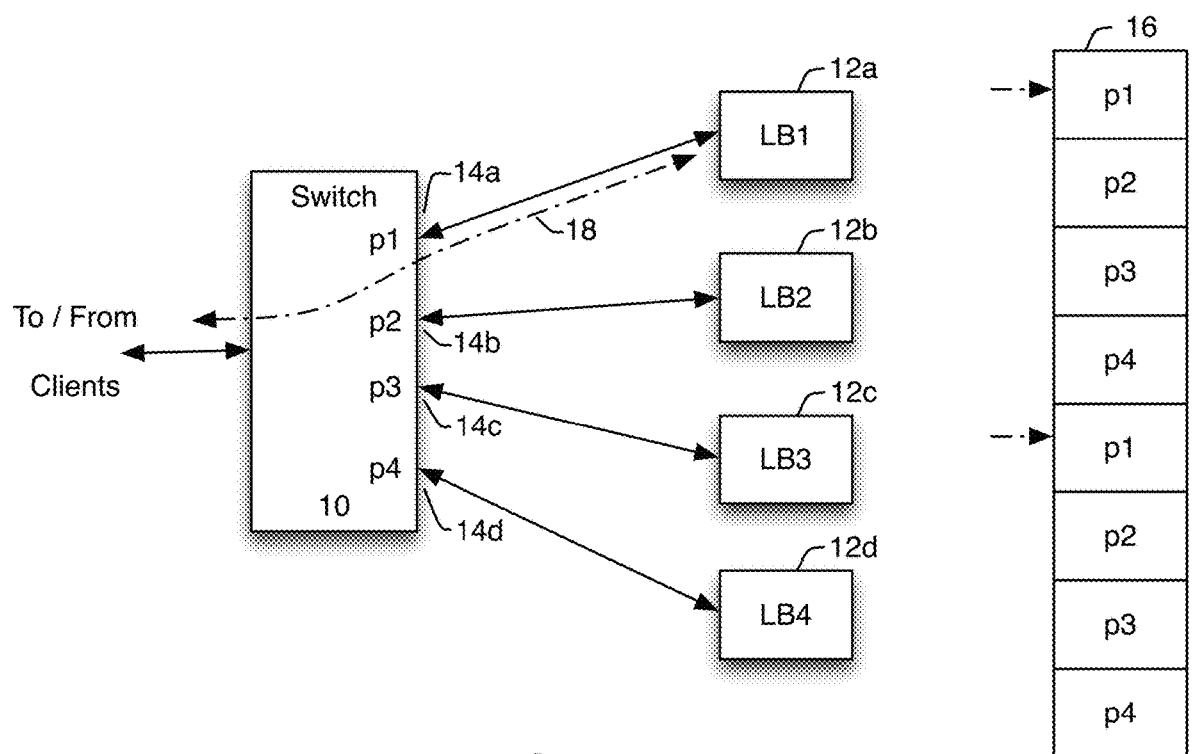
FIGS. 1A-1C illustrate aspects of a process for off-loading connections from a port of a network infrastructure apparatus in accordance with embodiments of the present invention.

Embodiments of the present invention provide systems and methods in and by which network infrastructure equipment may participate in flow steering decisions that affect load for paths within a network. Flow steering decisions are frequently encountered in modern data centers and other computer network installations, for example, such installations as make use of cloud-based infrastructures. In such environments, it is common to have multiple servers or other computer platforms configured to provide the same application or service for different users. The users are assigned, often unknowingly, to different instances of the applications according to any of several factors. Popular consumer web sites, for example, would quickly succumb to loads if the multiple users of such sites at any one time were not distributed across many instances of the site, yet from the standpoint of the users each are connected to the same web site.

As explained above, fronting the multiple instances of a web site or other Internet- or cloud-based service are one or more load balancers. The load balancers may be dedicated appliances or may be incorporated within other network equipment such as switches and the like. User connections, which are typically HTTP connections to a web server that use the transmission control protocol (TCP) to transfer information, are terminated at these load balancers, which then recast the connections to the server instances of the web site. By terminated we mean that the load balancer, rather than the actual server running the instance of the web site, provides the TCP connection acknowledgement to the initiating application on the sending computer system (usually a web browser or other client running on the user's computer platform). Such TCP connections are established during a so-called handshake process, before any data is exchanged between computer systems, and the connection acknowledgment is part of this handshake. More specifically, in response to a TCP SYN packet (representing a connection request) from a client, the load balancer will send a TCP SYN-ACK packet, representing an acknowledgment of the request. The handshake is completed by the requesting client returning a TCP ACK packet, acknowledging the load balancer's response.

At each of the client and the load balancer, the TCP connection is managed by an operating system or application through a programming interface that represents a local endpoint-a so-called port. This is a software construct but it is analogous to a hardware port at which a communication cable can be attached. In the case of the software port, it is a data communication organized according to a particular communication protocol, rather than a physical cable, that is "connected." In the case of communications conforming to the Internet protocol (IP), ports (typically identified by a number) are associated with IP addresses and protocol types, the IP address specifying the host on which the port is located and the protocol type specifying the port at that host. For example, a complete address may be of the form "protocol: TCP, IP address: 1.2.3.4, port number: 80" (or "1.2.3.4:80" where the TCP protocol is assumed). Port 80 is one of a number of well-known port numbers, and designates an HTTP connection. Other well-known port numbers, of which there are many, are used with connections of different types, and often the protocol type is not specifically noted as it may be inferred from the context in which the description of the port occurs.

Because load balancers are intermediaries between clients and services (such as web sites and the like), and terminate TCP connections from those clients, the load balancers must be associated with the IP addresses used by the clients to establish connections with the service. That is, requests for popular web sites associated with e-commerce sites, entertainment sites, search engines, and other services that can expect significant traffic, must be directed to IP addresses associated with the load balancers, rather than the actual servers hosting the service. Thus, the load balancers are associated with "virtual IP addresses" in the sense that these IP addresses of the load balancers act as proxies or stand-ins for the IP addresses of the servers hosting instances of the service. TCP connections from clients thus use the virtual IP addresses and port numbers of the load balancers rather than those of the service-hosting servers, and the load balancers are responsible for recasting the connections (using any of a number of load balancing protocols) to the service-hosting servers.

By acting as intermediaries between clients and services, load balancers reduce the burden on individual instances of a service, thus providing improved experiences for all concurrent users of the service. Different load balancing schemes can be used to distribute loads across multiple instances of a service. For example, a simple distribution scheme may assign connections in a round-robin fashion, while a more complex distribution scheme may take into account existing server loads and capabilities, client geographic locations, and other factors. Moreover, load balancing may occur at multiple hierarchical levels, with top-level load balancers distributing connections across geographically distinct data centers and lower-level load balancers distributing connections across individual servers within a data center or portion thereof. Common to all such installations, however, is the need for periodic maintenance, either of a lower tier load balancer or of one or more service-hosting servers. When these needs arise, the present invention provides a way for graceful off-loading of the connections assigned to a particular port of a load balancer, whether as an individual appliance or instantiated in another network infrastructure device.

In accordance with embodiments of the invention, when a particular communication path, e.g., represented by a port of a switch, load balancer, or other infrastructure device, is to undergo maintenance or otherwise requires decommissioning, connections assigned to that path (port) are replicated to another path (port) on the device. That is, all packets associated with flows over the affected port are duplicated and provided to a backup port associated with a backup server, load balancer, or other device. In one embodiment, this is achieved by changing the original destination port from a unicast port to a multicast group of ports, with the group including the original port (about to be decommissioned) and the port being used as a backup.

Next, a set of access control rules (e.g., in the form of an access control list) is installed on the port that is to be decommissioned. The access control rules are tailored to prevent new connections from being established on that port. Existing connections, i.e., those in place before the replication procedure is initiated, are unaffected and are allowed to remain. Thus, sessions between clients and the service associated with the port that is to be decommissioned are unaffected, and are allowed to proceed to a regular termination. Termination in this context refers to a TCP process in which, typically, both endpoints send a TCP FIN packet (indicating the endpoint wishes to terminate the connection) and acknowledge one another's transmissions. After timeouts (to see if any delayed packets arrive), the connection is closed.

Existing connections (those in place before the replication procedure is initiated) then, are serviced according to and remain associated with their original end-to-end topologies. That is, existing connections remain associated with the instances of the service with which they were initially established over the port of the network device in question. Although packets of those connections are replicated and provided to the backup instance of the service over the backup port, the backup instance of the service does not respond to those packets because it has no associated connection information with which to associate them. Because the existing connections are being replicated to the backup service in progress, there was no TCP handshake in which the backup service participated, hence, no connection table entry to associate with those packets. Therefore, although packets of the existing connections may be observed at the backup service, they are dropped at the backup server or load balancer.

Packets associated with new connections, however, are handled differently. These new connections, i.e., ones which were not in place with the original instance of the service before the replication procedure was initiated, will only be established with the backup service. Because they are new, these connections will have associated TCP handshakes. Packets associated with a new connection are replicated at the switch and provided to to the backup service on the backup port. However, the access control lists on the port associated with the original instance of the service prevent any initiation of the new connection with the original instance of the service. That is, the packets are dropped and are not passed on to the switch or other network infrastructure component fronting the original instance of the service. Acknowledgements by the backup service on the backup port are allowed to proceed to the new connection requesting client. Thus, the new connection is established with the backup instance of the service, but not the original instance of the service.

Note, although we indicate that the new connections will involve new TCP handshakes, it remains the case that the switch or other network infrastructure component fronting the backup instance of the service terminates the TCP connection from the client. So, for the new connections, it is the switch or other network infrastructure component that established a separate TCP connection with the backup service over the backup port that coordinates the transfer of packets between the client and backup service over the different connections. For ease of discussion, we will show and discuss the connections between client and service as though they were end-to-end, but in practice they are separate.

Over time, the process of not permitting new connections on the port associated with the original instance of the service will ensure that all connections are with the backup service on the backup port and that no connections to the original instance of the service on its associated port remain. The time it takes for this state to be reached will depend on how many connections there were with the original service at the time the packet replications began, and how long the existing sessions persist afterwards. In one embodiment, traffic over the original port is monitored (at either or both ends) and when no such traffic is detected within a specified time window (e.g., a few minutes), this is an indication that all previously existing connections on that port have been concluded. Once no further connections remain with the original instance of the service, the port associated with that instance can be decommissioned, and the maintenance or other needed actions with respect thereto taken. Thus, there has been a graceful handover to the backup service on the backup port in the sense that no connections were dropped or otherwise disrupted during the process of decommissioning the port associated with the original instance of the service. Moreover, the handover was achieved without the need for installing additional infrastructure equipment.

In some embodiments of the invention, certain load balancing techniques may be employed with respect to forming new connections on the backup port. For example, resilient hashing at the switch or other network infrastructure installation may be employed so that connections on ports unaffected by the replication are not shifted to the backup port. This will ensure the backup port is not overloaded with connections and is allowed to take on all new connections that were destined for the original instance of the service. Alternatively, if the backup port is already participating in a load balancing protocol, the protocol may be altered to take into account the new load experienced by the backup port. That is, new connections may be distributed across more than just one backup port so as to share the load that would have been destined to the now decommissioned port.

The various apparatus discussed herein, including the load balancers, switches, servers, etc., may each be implemented on processor-based platforms in which stored processor-executable instructions are executed so as to cause the respective apparatus to perform the functions described above. These instructions are typically stored on one or more processor-readable storage mediums, such as memories, disk drives, flash drives, or other persistent or erasable/writable media, accessible to processing elements of the processor-based platform. The algorithms and processes so stored and presented herein are not inherently related to any particular computer system, processor or other apparatus. Moreover, any of the present methods can be implemented in hard-wired circuitry, by appropriate programming of a computer processor or processors, or any combination of hardware and software.

Processor-based systems suitable for use in accordance with the present invention will typically include, in addition to the processor and storage media, communication means, such as one or more busses, communicatively coupling the processor and storage media (and other elements of the processor-based platform), main memory, such as a random access memory (RAM) or other dynamic storage device, for storing information (such as temporary variables or other intermediate information during execution of instructions to be executed by processor) and instructions to be executed by the processor, and network interfaces with modems appropriate to the wired and or wireless computer networks of which the processor-based platforms are a part to permit data communications with like platforms. Where interactions with users are required or expected, such platforms may also include displays and user input means, such as keyboards and cursor control devices.

Referring now to FIG. 1A, an example of a switch 10 having load balancing capabilities and fronting a bank of load balancers LB1-LB4 (12a-12d) is illustrated. The load balancers 12a-12d may, in turn, each front one or more servers (not shown), or even entire data centers, with additional tiers of load balancers in downstream communication paths. Each load balancer 12a-12d is associated with a respective port p1-p4 (14a-14d) of the switch 10. Load balancer 12a is associated with port 14a, load balancer 12b is associated with port 14b, load balancer 12c is associated with port 14c, and load balancer 12d is associated with port 14d. Although only four load balancers and four associated ports are illustrated, in practice there could be any number of such load balancers and ports. Illustrated at 16 is a representation of hash buckets maintained (in memory) by the switch 10. Connections arriving at switch 10 are allocated to ports 14a-14d, and, hence, to an associated load balancer 12a-12d, according to a hashing operation on the connection (e.g., on parameters associated with packets of the connection). Thus, in this example, connections are assigned to ports on a statistical basis, though in other instances different or additional bases of allocation could be used.

As shown in the illustration, certain connections or flows 18 associated with one or more clients and terminated at switch 10 are hashed to port p1 (14a), which is associated with load balancer LB1 (12a). Assume for purposes of this example that this load balancer, LB1, is to be taken off-line, e.g., to allow for servicing of servers fronted by the load balancer, or because the load balancer itself needs maintenance. The present invention will accommodate this situation by gracefully discontinuing sessions with load balancer LB1 according to the above-described protocol.

Figure 1B:
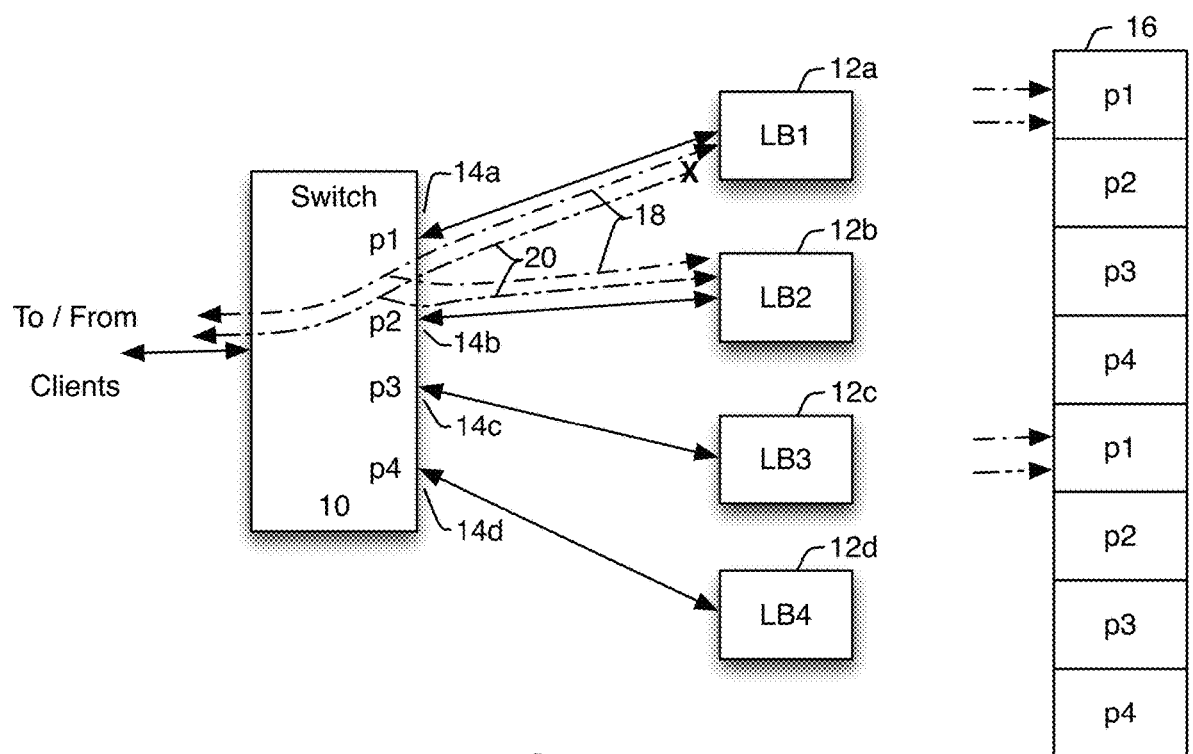

First, referring to FIG. 1B, port p2 on switch 10 is designated a backup port for port p1. This means that packets destined for port p1 at switch 10 are replicated and also transmitted over port p2. Together, ports p1 and p2 define a replication group m1:

PBR: match tcp-o p1 -j REDIRECT m1

Port p2 is associated with load balancer LB2 (12b), hence, the replicated packets will ultimately end up at a service fronted by load balancer LB2.

Concurrently with the replication process, access control lists are established on port p1 so that no new connections are established:

ACL: match tcp syn -o p1 -j DROP

During the fail over process, when a packet is replicated on both the original port, p1, and the backup port, p2, the load balancer, LB2, associated with the replicated packet and which does not have an existing connection with which to associate it, will try to reset the connection by returning a TCP RST. If allowed to proceed, this would result in disconnecting the on-going session over the original port, p1. To prevent this from occurring, the TCP RST needs to be dropped at port p2:

ACL: match tcp rst -i p1|p2 -j DROP

As packets arrive at switch 10, they continue to be assigned to ports on the basis of the hash operation. This means that there will be packets associated with both existing connections 18 and with new connections 20, each hashed to port p1, transmitted by switch 10 on ports p1 and p2. The access control lists ensure that no new connections are established on port p1. Existing connections, however, are allowed to persist to their natural conclusion. Also, only the new connections are allowed to be established on port p2.

Figure 1C:
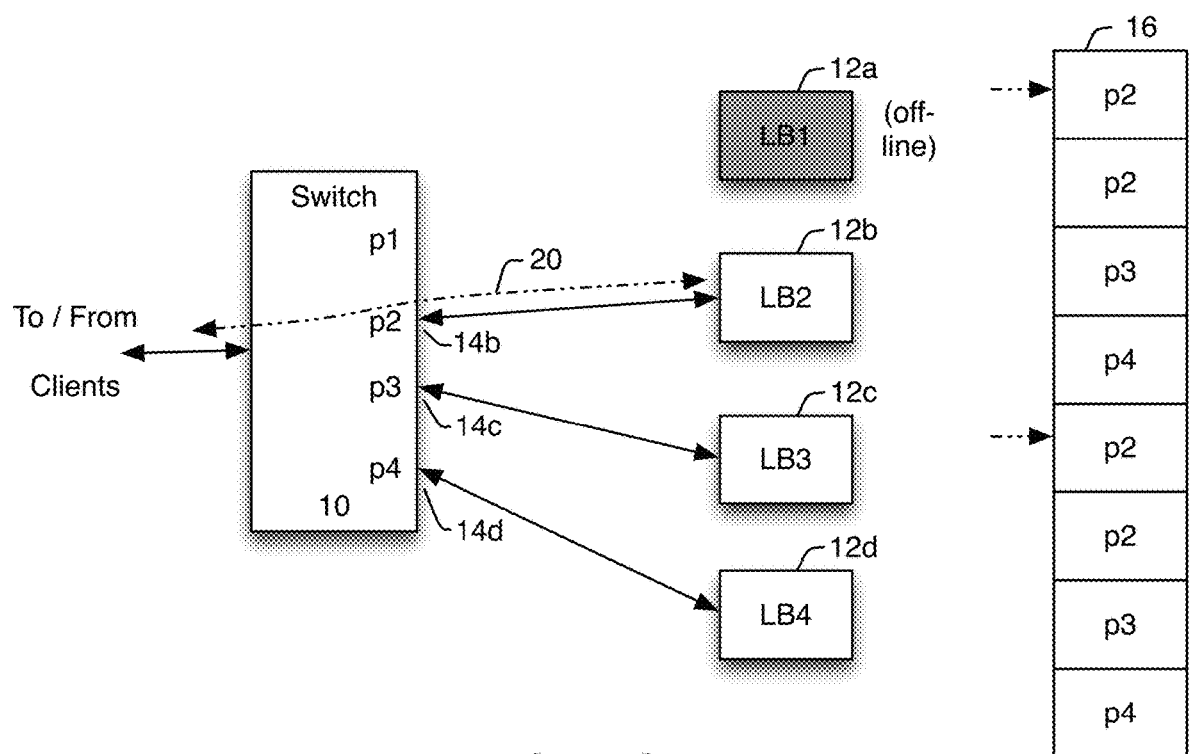

Eventually, as shown in FIG. 1C, all of the previously existing connections will have been terminated. This condition can be identified at switch 10 and/or load balancer 12a through monitoring of traffic over port p1. When no such traffic is detected within a specified time window (e.g., a few minutes), this is an indication that all previously existing connections will have been terminated. At this time, load balancer LB1 can be taken off-line. That is, the port can be decommissioned when an absence of connections thereon has been identified. New connections have been established on port p2 and continue to be directed to port p2 by switch 10. With load balancer LB1 off-line, the access control lists and replication group settings on the ports can be removed.

Thus, systems and methods by which network infrastructure equipment may participate in flow steering decisions that affect load for paths within a network, and, in particular, a flow-based session drain director, have been described. The present invention provides for graceful fail over without the need for individual flow tracking, which is often costly in terms of complexity and traffic throughput degradation. For example, no additional load balancers are needed to front the equipment at which one or more ports are being decommissioned. To ensure optimal traffic distribution during port maintenance procedures, multiple backup paths may be used simultaneously (if available), each forming a separate multicast group with the in-maintenance path. Multiple redirection rules may be employed, with a path index serving as an additional match criterion. For example, when replicating the new connections, such replications may be made on multiple "second" ports by establishing a plurality of separate multicast groups, one each for each instance of a "second" port and the original port which is to be decommissioned. Then, the new connections may be allocated to individual ones of the multicast groups according to a desired load balancing protocol, which may be the same as or different from an original load balancing protocol used in connection with the port to be decommissioned. The above-described methods may, in some instances be instantiated as processor-executable instructions on a computer-readable medium, such as a memory, and executed by a processor to achieve the above-described results.

What is claimed is:

1. In a network including a first network element, a second network element, and a third network element, the first network element having a plurality of downstream network elements communicatively connected via respective ports, the second network element being communicatively connected to the first network element via a first port of the first network element, the third network element being communicatively connected to the first network element via a second port of the first network element, wherein connections are allocated to ports at the first network element according to a load balancing protocol, a method, comprising:

for existing connections between the first network element and the second network element on the first port, replicating said existing connections between the first network element and the second network element on the second port;

for new connections between the first network element and the second network element allocated to the first port according to the load balancing protocol, replicating said new connections on the second port;

configuring the first port to prevent initiation of the new connections with the second network element on the first port;

monitoring the first port to identify an absence of connections thereon; and decommissioning a communicative coupling between the first network element and the second network element on the first port when the absence of connections on the first port has been identified.

2. The method of claim 1, wherein configuring the first port to prevent initiation of the new connections with the second network element on the first port comprises installing access control restrictions on the first port.

3. The method of claim 1, further comprising configuring the second port to drop connection reset requests from the third network element associated with replicated ones of the existing connections.

4. The method of claim 1, wherein connections between the first network element and the second network element on the first port are replicated on the second port by defining a replication group that includes the first port and the second port.

5. The method of claim 1, further comprising, at the first network element, load balancing connections across the second port and other ports of the first network element to accommodate load on the second port created by replication of connections on the first port on the second port.

6. A non-transitory computer-readable medium having stored thereon processor-executable instructions, which instructions, when executed by a processor cause the processor to perform steps comprising:

replicating existing connections between a first network element including said processor and a second network element on a first port of the first network element on a second port of the first network element;

replicating new connections between the first network element and the second network element allocated to the first port of the first network element by a load balancing protocol on the second port;

configuring the first port of the first network element to prevent initiation of the new connections with the second network element on the first port;

monitoring the first port to identify an absence of connections thereon; and decommissioning a communicative coupling between the first and second network elements on the first port when the absence of connections on the first port has been identified.

7. The non-transitory computer-readable medium of claim 6, wherein the instructions, when executed by the processor, further cause the processor to install access control restrictions on the first port to prevent initiation of the new connections with the second network element on the first port.

8. The non-transitory computer-readable medium of claim 6, wherein the instructions, when executed by the processor, further cause the processor to configure the second port to drop connection reset requests from a third network element associated with replicated ones of the existing connections, said third network element being communicatively connected to the first network element via the second port.

9. The non-transitory computer-readable medium of claim 6, wherein the instructions, when executed by the processor, further cause the processor to replicate connections between the first network element and the second network element on the first port according to a defined replication group that includes the first port and the second port.

10. The non-transitory computer-readable medium of claim 6, wherein the instructions, when executed by the processor, further cause the processor to load balance connections across the second port and other ports of the first network element to accommodate load on the second port created by replication of connections on the first port on the second port.

11. A network infrastructure apparatus having a plurality of ports, said apparatus comprising:

a processor; and a memory, communicatively coupled to the processor, said memory storing processor-executable instructions, which instructions, when executed by the processor cause the processor to perform steps comprising:

replicating existing connections between the network infrastructure apparatus and a first network element on a first port of the plurality of ports of the network infrastructure apparatus on a second port of the plurality of ports of the network infrastructure apparatus;

replicating new connections between the network infrastructure apparatus and the first network element allocated, by a load balancing protocol, to the first port of the network infrastructure apparatus on the second port of the of the network infrastructure apparatus;

configuring the first port of the network infrastructure apparatus to prevent initiation of the new connections with the first network element on the first port;

monitoring the first port to identify an absence of connections thereon; and decommissioning a communicative coupling between the network infrastructure apparatus and the first network element on the first port when the absence of connections on the first port has been identified.

12. The network infrastructure apparatus of claim 11, wherein the instructions, when executed by the processor, further cause the processor to install access control restrictions on the first port to prevent initiation of the new connections with the first network element on the first port.

13. The network infrastructure apparatus of claim 11, wherein the instructions, when executed by the processor, further cause the processor to configure the second port of the network infrastructure apparatus to drop connection reset requests associated with replicated ones of the existing connections.

14. The network infrastructure apparatus of claim 11, wherein the instructions, when executed by the processor, further cause the processor to replicate connections between the network infrastructure apparatus and the first network element on the first port according to a defined replication group that includes the first port and the second port.

15. The network infrastructure apparatus of claim 11, wherein the instructions, when executed by the processor, further cause the processor to load balance connections across the second port and other ports of the network infrastructure apparatus to accommodate load on the second port created by replication of connections on the first port on the second port.

* * * * *